(12) United States Patent
Kol

(10) Patent No.: US 10,476,174 B2
(45) Date of Patent: Nov. 12, 2019

(54) PATCH ANTENNAS CONFIGURATION FOR AN UNMANNED AERIAL VEHICLE

(71) Applicant: UVISION AIR LTD, Zur Igal (IL)

(72) Inventor: Yehuda Kol, Beit Ezra (IL)

(73) Assignee: UVISION AIR LTD., Zur Igal (IL)

( * ) Notice: Subject to any disclaimer, the term of this patent is extended or adjusted under 35 U.S.C. 154(b) by 0 days.

(21) Appl. No.: 15/755,619

(22) PCT Filed: Aug. 25, 2016

(86) PCT No.: PCT/IL2016/050933
§ 371 (c)(1),
(2) Date: Feb. 27, 2018

(87) PCT Pub. No.: WO2017/037696
PCT Pub. Date: Mar. 9, 2017

(65) Prior Publication Data
US 2018/0254565 A1    Sep. 6, 2018

(30) Foreign Application Priority Data

Sep. 1, 2015  (IL) .......................................... 241025

(51) Int. Cl.
*H01Q 25/00* (2006.01)
*H01Q 1/28* (2006.01)
*H01Q 9/04* (2006.01)
*B64C 39/02* (2006.01)
*H01Q 3/24* (2006.01)

(52) U.S. Cl.
CPC ......... *H01Q 25/005* (2013.01); *B64C 39/024* (2013.01); *H01Q 1/286* (2013.01); *H01Q 9/0421* (2013.01); *B64C 2201/021* (2013.01); *B64C 2201/122* (2013.01); *B64C 2201/165* (2013.01); *H01Q 3/24* (2013.01)

(58) Field of Classification Search
CPC .... H01Q 25/005; H01Q 1/286; H01Q 9/0421; B64C 39/024; B64C 2201/165
USPC .......................................................... 343/705
See application file for complete search history.

(56) References Cited

U.S. PATENT DOCUMENTS

| | | | |
|---|---|---|---|
| 7,307,579 B2 * | 12/2007 | Rees ........................ | H01Q 1/28 340/961 |
| 9,614,608 B2 * | 4/2017 | Jalali .................... | H04B 7/2041 |
| 9,918,235 B2 * | 3/2018 | Brennan ............... | H04W 16/28 |
| 9,983,579 B2 * | 5/2018 | Caubel .................. | B64D 47/08 |
| 2010/0123042 A1 | 5/2010 | Ballard et al. | |
| 2012/0267472 A1 | 10/2012 | Pratzovnick et al. | |
| 2014/0159949 A1 | 6/2014 | Mialhe | |

(Continued)

*Primary Examiner* — Brian K Young
(74) *Attorney, Agent, or Firm* — Law Offices of Steven W. Weinrieb

(57) ABSTRACT

Antennas configuration for unmanned aerial vehicle (UAV) comprising at least one pair of patch antennas. Each patch antenna having a patch mounted on a ground plane. A UAV body having at least one portion constructed of material that minimally attenuates the electromagnetic signal transmitted or received by said plurality of antennas. Wherein the at least one pair of patch antennas are mounted within the UAV body and near the inner surface of the UAV body. Each antenna from the pair of patch antennas further installed opposite to one another and each of the patches facing outside from the UAV body.

20 Claims, 2 Drawing Sheets

(56) References Cited

U.S. PATENT DOCUMENTS

2014/0266950 A1 9/2014 Cicero
2015/0340759 A1 11/2015 Bridgelall et al.

* cited by examiner

PATCH ANTENNAS CONFIGURATION FOR AN UNMANNED AERIAL VEHICLE

FIELD OF THE INVENTION

The present invention relates to patch antennas configuration, more specifically the present invention relates to patch antennas configuration for unmanned aerial vehicle (UAV).

BACKGROUND OF THE INVENTION

An unmanned aerial vehicle (UAV), commonly known as a drone is an aircraft without a human pilot aboard. Its flight is controlled either autonomously by onboard computers or by remote control of a pilot on the ground or in another vehicle. Smaller and lighter weight Unmanned Aerial Vehicles (UAVs) and drones are increasingly being used for many applications such as but not limited to intelligence and acrobatic maneuvers applications. Some of the small UAVs may also be able to be collapsible and carried by the user within a small bag when the UAV is not in used. To increase capabilities of these aircrafts, lighter weight, more aerodynamic and small antennas are required.

A patch antenna (also known as a rectangular microstrip antenna) is a type of radio antenna with a low profile, which can be mounted on a flat surface. A typical patch antenna consists of a flat rectangular sheet or "patch" of metal which are used as radiating element, mounted over a larger sheet of metal called a ground plane. A coaxial cable extends through the ground plane at a selected location and the center pin of the coaxial cable is connected to the radiating element. The assembly is usually contained inside a plastic radome, which protects the antenna structure from damage. Patch antennas are simple to fabricate and easy to modify and customize A patch antenna is usually constructed on a dielectric substrate.

The Planar Inverted-F antenna (PIFA) is a type of patch antenna and is increasingly used in the mobile phone market. The antenna is resonant at a quarter-wavelength. This antenna resembles an inverted F, which explains the PIFA name. The Planar Inverted-F Antenna is popular because it has a low profile and an omnidirectional electromagnetic pattern. For further reducing the length of the PIFA antenna it's common to use a capacitive loading in PIFA antennas. In this technique, a capacitance is added to the PIFA antenna, between the feed point and the open edge.

U.S. Pat. No. 4,896,160 discloses an airborne surveillance platform utilizes a low aspect ratio delta-shaped aircraft having a radar-transparent hull. The antenna is located within, and stationary relative to, the hull. The antenna comprises planar or linear phased arrays arranged to scan in a continuous pattern in all azimuthal directions. Planar phased arrays can be arranged to scan in a continuous pattern in the range from zenith to nadir or in portions of that range.

U.S. Pat. No. 6,452,537 discloses a system and method for scanning through a 360 DEG azimuth by a surveillance radar antenna. The method includes driving at slow speed, the radar antenna including two electronic scanning antennas installed back to back, simultaneously controlling the electronic aiming of each of the two electronic scanning antenna, switching the microwave signal sent alternatively between the two electronic scanning antennas and, before each rotation of the radar beam, initializing the electronic aiming of each of the two elementary electronic scanning antenna at a determined angle. The radar system includes the radar antenna with the two elementary electronic scanning antennas and an aiming computer.

US2012267472 discloses a sensor/emitter arrangement integrated into the fuselage structure of a specially designed air vehicle, in which the air vehicle is configured for optimizing operation of the sensor/emitter arrangement with respect to at least azimuthal lines of sight radiating along a azimuthal reference plane of the air vehicle. The azimuthal reference plane intersects the air vehicle fuselage. The fuselage can be formed with a plurality of oblate cross-sections that facilitate maximizing the room available for a sensor/emitter array that is elongated along an elongate axis that may be aligned with the azimuthal reference plane. One or more such elongate axes may be inclines to the longitudinal (roll) axis and the pitch axis of the air vehicle. The air vehicle may have a blunt aft end incorporating an elongate aft-facing sensor/emitter array.

WO2009049595 discloses a double-lobe antenna system for passive Electronic Support Measures (ESM) sensors having a large bandwidth, it is proposed that two identical antennas having a corresponding bandwidth are disposed back to back and that a reflector is provided for bundling and deflecting the lobe of the rear antenna. The double-lobe antenna system having a wide and a narrow lobe has the same bandwidth for each lobe, has a simple, robust, and compact design, and the wide lobe can completely surround the narrow lobe.

One object of the present invention is to provide an air data terminal (ADT) that include light weight and small air data antenna(s) located within the body of a UAV. The body of the UAV is electromagnetically transparent and acts a as an antenna radome.

Yet another object of the present invention is to provide one or more small and lightweight ADT antenna located within the body of the UAV and having full antenna coverage at one or more predetermined frequency bandwidths.

Yet another object of the present invention is to provide one or more small and lightweight ADT antenna located within the body of the UAV and having full antenna coverage, to ensure proper data link to ground station, even when the UAV is doing acrobatic and sharp flight maneuvers.

Yet another object of the present invention is to provide one or more small and lightweight ADT antenna which can be easily assembled within the body of a UAV and can be also reassembled from the UAV body.

SUMMARY OF THE INVENTION

The present invention relates to patch antennas configuration, more specifically the present invention relates to PIFA antennas configuration for unmanned aerial vehicle (UAV).

In accordance with an embodiment of the present invention, there is provided antenna configuration for unmanned aerial vehicle (UAV) comprising at least one pair of patch antennas each patch antenna having a patch mounted on a ground plane. A UAV body having at least one portion constructed of material that minimally attenuates the electromagnetic signal transmitted or received by said plurality of antennas. Wherein said at least one pair of patch antennas are mounted within said UAV body and near the inner surface of said UAV body. Each antenna from the pair of patch antennas further installed opposite to one another and each of the patches facing outside from the UAV body.

In accordance with some embodiments, the plurality of patch antennas is of Planar Inverted-F Antenna (PIFA) type.

In accordance with another embodiment of the present invention the pair of patch antennas is installed on antenna assembly or base located inside of the UAV.

In accordance with another embodiment of the present invention the UAV body has a cylindrical shape and the antenna assembly is constructed in a way that the antennas are assembled inside of the UAV cylindrical body as close as available to the inner surface of the UAV body.

In accordance with another embodiment of the present invention the pair of patch antennas is positioned in opposite to one another in such a way that both antennas radiating elements are faced opposite to the other and together has an omni-directional of electromagnetic coverage. One of the pair of patch antennas have a better electromagnetic coverage in the front of the UAV body in respect to the second patch antenna while the other patch antenna have a better electromagnetic coverage in the rear of the UAV body in respect to the first patch antenna.

BRIEF DESCRIPTION OF THE DRAWINGS

The invention may be understood upon reading of the following detailed description of non-limiting exemplary embodiments thereof, with reference to the following drawings, in which.

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF EMBODIMENTS OF THE INVENTION

Figure 1:
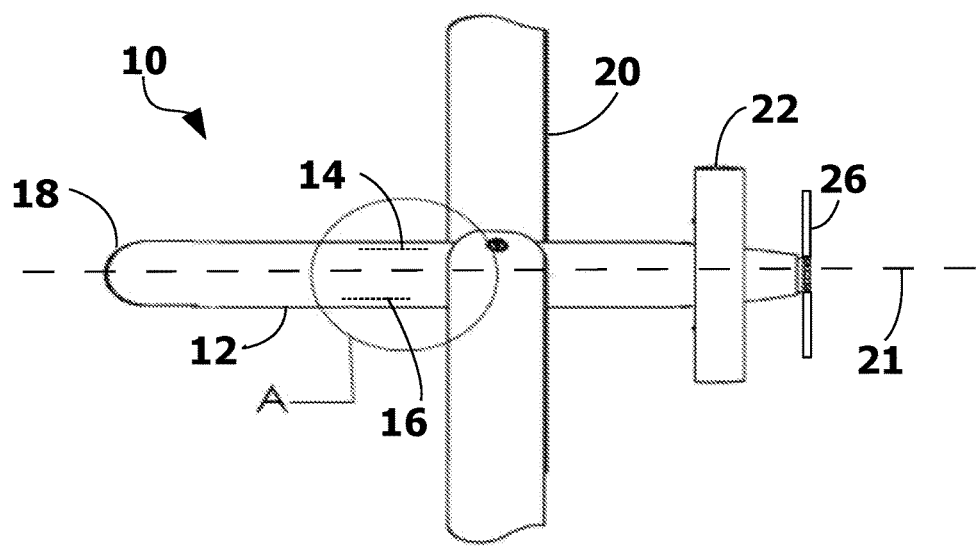
FIG. 1 is a perspective top view of a UAV platform with a pair of patch antennas installed in the UAV body or base and the antennas are positioned opposite to one another.

Referring first to FIG. 1, there is shown an exemplary of an unmanned aerial vehicle (UAV) platform 10 having a body 12 with one or more portions constructed of material that minimally attenuates the electromagnetic signal transmitted or received by patch antennas 14 and 16 installed within the UAV. The patch antennas 14 and 16 in the figure are schematically illustrated designated by dashed lines respectively. In some embodiments of the present invention the entire UAV body may constructed from a material that minimally attenuates the electromagnetic signal transmitted or received by antennas 14 and 16 installed within the UAV. The UAV body may constructed from a composite material preferably fiberglass and preferably the sandwich construction is desirable. The sandwich construction includes of smooth layers of resin-impregnated cloth that are adhered to both sides of a dielectric (electrically insulating) honeycomb or foam core. The thickness and type of the core material vary for example according to wave-length of the radar frequency for best signal transmission, and according to the size of the UAV for structural strength. Parts of the aircraft body and internal structure and components may affect performance of the internals antennas. Therefore, both antennas are tuned and calibrated when they are already installed within the UAV and in a fully populated UAV. Thereby, the entire UAV plays the role of part of the antenna in order to ensure best fitting to relevant frequency band and band-width, while maintaining omni-directional electromagnetic coverage for proper data link between the UAV and a ground station. An example of antenna tuning and calibration is to measure the antenna gain over sweep of frequencies for example by using a network analyzer and then to calibrate and tune the antenna to the desired frequency band and band width for example by changing slightly the patch dimensions of the patch antenna. In some embodiment of the present invention the patch of the patch antenna can be removable and replaceable.

The UAV in the figure have a hollow cylindrical-shaped body 12 with a nose cone 18 in one corner at the far most section of the UAV body 12. The nose cone 18 is typically shaped to offer minimum aerodynamic resistance. The UAV platform further includes wings 20 and steering plates 22. Instead of steering plates 22 the UAV may include stabilizers. The UAV further includes a propellers 26 which may mounted on the back of the UAV body 12 which is used for propelling the UAV. In accordance with some embodiments of the present invention patch antennas 14 and 16 are installed within the UAV body as shown in figure in section A. The patch antennas 14 and 16 are disposed opposite to one another near the interior surface of the UAV body 12. The patch antennas 14 and 16 can be mounted on a base, not shown, connected to the interior surface of the UAV body. The UAV antennas also installed in such a way that the patches of the patch antennas 14 and 16 are pointing to the exterior of the UAV body 10, not shown in the figure. The dashed line 21 designates the longitudinal axis of the UAV body 12. The antennas 14 and 16 are positioned approximately near the middle of the UAV body 12 in respect to the UAV length. These patch antennas arrangement is desired in order to achieve an omni-directional electromagnetic coverage and to ensure a proper data link between the UAV and a ground station. In some embodiments of the present invention the antennas are not vertically aligned to one another in respect to the longitudinal axis 21. This arrangement is desired in order to improve the overall electromagnetic coverage of both patch antennas 14 and 16 particularly in the bottom portion and in the front portion of the UAV. For example, patch antenna 16 is positioned closer to the UAV nose cone 18 to improve the electromagnetic coverage area in the rear of the UAV while patch antenna 14 is positioned slightly closer to the bottom portion of the UAV where the propeller 26 is installed in order to improve the electromagnetic cover in the front section of the UAV 10. These arrangements of both antennas 14 and 16 as described above enables a radiation pattern of 360 degrees in the horizontal and the vertical radiation patterns. These radiation patterns which are achieved by both of the patch antennas 14 and 16 will continuously enable to transmit and receive wireless data communication from/to antennas 14 and/or 16 even when the UAV is performing sharp or acrobatic maneuvers. During UAV flight the UAV may do flight maneuvers thus, during the flight, patch antenna 14 may receive for example stronger signal than the patch antenna 16. During UAV flight the UAV may do flight maneuvers thus during the flight UAV ground station may receive for example stronger signal from patch antenna 14 than from patch antenna 16. Thus, to decrease noise interferences in some embodiments of the present invention the patch antenna with the strongest signal during a segment of time will be used to transmit and/or receive wireless data communication to/from UAV ground control station. An example of a UAV ground control station can be a portable ground control station that provides the facilities for human control of the UAV 10.

Figure 2:
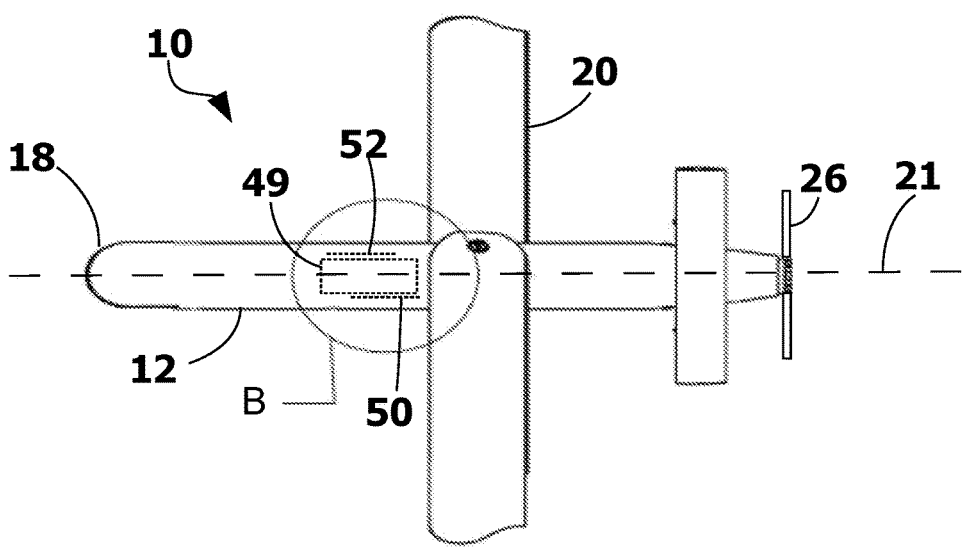
FIG. 2 is a top perspective view of a UAV platform with a pair of patch antennas installed on an antenna assembly in the UAV body with the antennas positioned opposite to one another.
Figure 3:
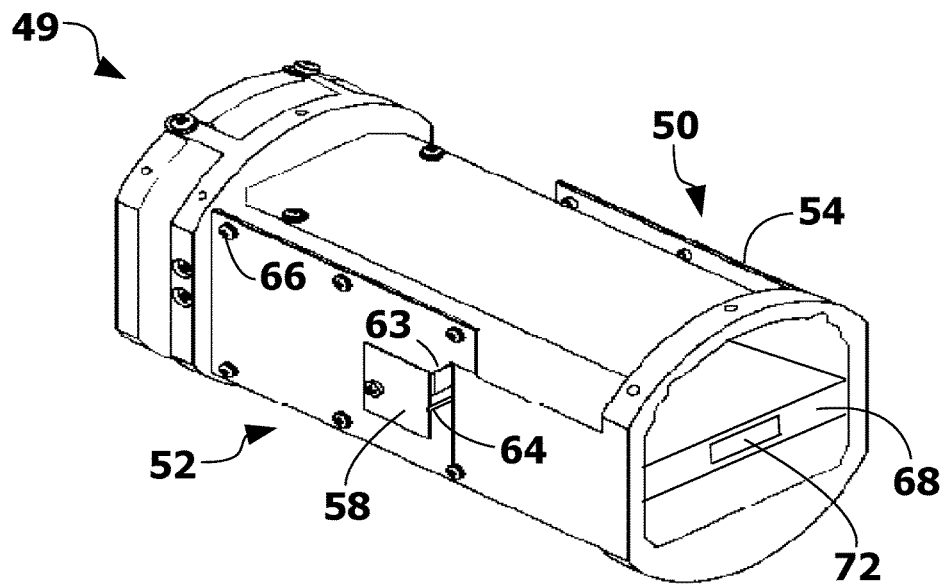
FIG. 3 is a perspective left side view of the antenna assembly in accordance with the present invention.
Figure 4:
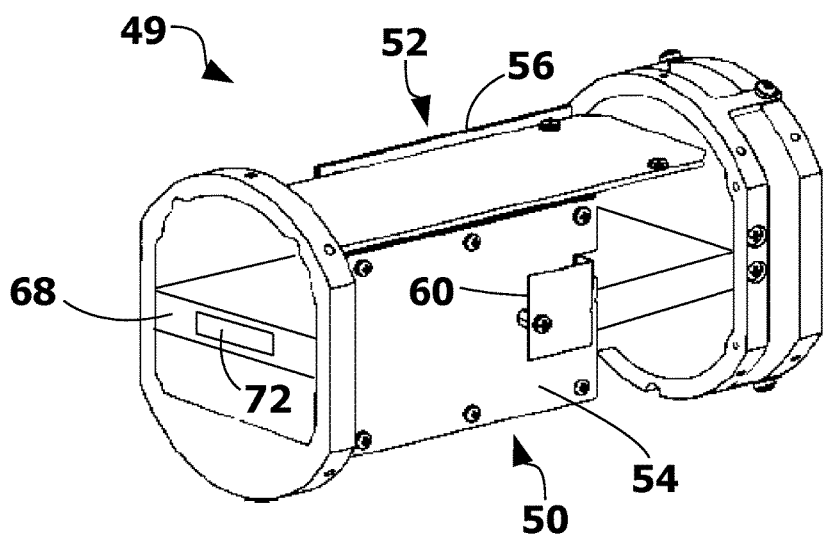
FIG. 4 is a perspective right side view of the antenna assembly depicted in FIG. 3.

In FIG. 2 section B and in FIGS. 3, 4, there is shown an antenna assembly 49. Two Planar Inverted-F antennas (PIFA) 50 and 52 are mounted on the sides of the antenna assembly 49. In other embodiment of the present invention the PIFAs antenna can be mounted on the bottom portion and the upper portion of the antenna assembly. While in another embodiment of the present invention pair of PIFAs antennas can be mounted on the sides of the antenna assembly 49 and another pair of PIFAs antenna can be mounted opposite to one another on the upper and bottom portions of the antenna assembly 49 respectively.

The PIFAs 50 and 52 include local ground planes 54 and 56 respectively. The PIFAs 50 and 52 further include patches or plates 60, 58 typically made of metal. The shorting post 63 or in some embodiments shorting pin extends perpendicular at one edge of the PIFA to the ground plane 56 as shown for example in FIG. 3. The feed 64 is along the same edge of the shorting post as shown in FIG. 3. The ground planes 54 and 56 can be connected to the antenna assembly 49 for example by a screw 66 which enables the PIFAs 50 and 52 to be easily removable and replaceable from antenna assembly 49 when desired. The interior of the antenna assembly 49 is hollow to allow assembly of electronic RF cards and components 68. The feed 64 of the antenna 52 is connected for example by a coaxial cable, not shown, to RF electronic card 68 which support the PIFAs 50 and 52. Preferably, antenna assembly 49 is having a cylindrical shape to fit inside the UAV cylindrical body 12. The electronic and RF cards may include one or more connectors 72 to electrically connect with other UAV electronic cards or devices.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. An antenna configuration for an unmanned aerial vehicle (UAV), comprising:
   at least one pair of patch antennas wherein each one of said at least one pair of patch antennas has a patch mounted upon a ground plane;
   an unmanned aerial vehicle (UAV) body having at least one portion constructed of a material that minimally attenuates an electromagnetic signal transmitted or received by any one of said at least one pair of patch antennas;
   wherein said at least one pair of patch antennas are mounted within said unmanned aerial vehicle (UAV) body so as to be near an inner surface portion of said unmanned aerial vehicle (UAV) body;
   wherein said at least one pair of patch antennas are installed so as to be disposed opposite to one another;
   wherein each one of said patches of said at least one pair of patch antennas faces outwardly from said unmanned aerial vehicle (UAV) body; and
   wherein said at least one pair of patch antennas comprise Planar Inverted-F Antenna (PIFA) type antennas.

2. An antenna configuration for an unmanned aerial vehicle (UAV) according to claim 1, wherein:
   said at least one pair of patch antennas are installed upon an antenna assembly located inside of said unmanned aerial vehicle (UAV).

3. An antenna configuration for an unmanned aerial vehicle (UAV) according to claim 2, wherein:
   said at least one pair of patch antennas can be reassembled from said antenna assembly.

4. An antenna configuration for an unmanned aerial vehicle (UAV) according to claim 2, wherein:
   said antenna assembly further comprises removable RF and electronic cards supporting said at least one pair of patch antennas.

5. An antenna configuration for an unmanned aerial vehicle (UAV) according to claim 1, wherein:
   said unmanned aerial vehicle (UAV) body has a cylindrical shape.

6. An antenna configuration for an unmanned aerial vehicle (UAV) according to claim 2, wherein:
   said antenna assembly is constructed in such a manner that said at least one pair of patch antennas are assembled inside of said unmanned aerial vehicle (UAV) cylindrical body as close as is available to said inner surface portion of said unmanned aerial vehicle (UAV) body.

7. An antenna configuration for an unmanned aerial vehicle (UAV) according to claim 1, wherein:
   in order to decrease noise interference with said at least one pair of patch antennas, the patch antenna, of said at least one pair of patch antennas, having the strongest signal during a segment of time will be used to transmit and/or receive wireless data communication to/from an unmanned aerial vehicle (UAV) ground control station.

8. An antenna configuration for an unmanned aerial vehicle (UAV) according to claim 1, wherein:
   said at least one pair of patch antennas are positioned in such a manner that antenna radiating elements of said at least one pair of patch antennas are disposed opposite to one another and together have omni-directional electromagnetic communication so as to ensure a proper data link between said unmanned aerial vehicle (UAV) and a ground control station; and
   wherein a first one of said at least one pair of patch antennas has better electromagnetic communication coverage within a front region of said unmanned aerial vehicle (UAV) with respect to a second one of said at least one pair of patch antennas, while said second one of said at least one pair of patch antennas has better electromagnetic communication coverage within a rear region of said unmanned aerial vehicle (UAV) with respect to said first one of said at least one pair of patch antennas.

9. An antenna configuration for an unmanned aerial vehicle (UAV) according to claim 1, wherein:
   both of said at least one pair of patch antennas are tuned and calibrated in a fully populated unmanned aerial vehicle (UAV) in order to ensure that said at least one pair of patch antennas fit best with respect to a relevant frequency band and band-width, while maintaining an omni-directional electromagnetic communication coverage so as to ensure a proper data link between said unmanned aerial vehicle (UAV) and a ground control station.

10. An antenna configuration for an unmanned aerial vehicle (UAV) according to claim 1, wherein:

each patch of said at least one pair of patch antennas is removable and replaceable with another patch having a slightly different dimension.

11. An antenna configuration for an unmanned aerial vehicle (UAV) according to claim 2, wherein:
said at least one pair of patch antennas are mounted opposite to one another and within upper and lower regions of said antenna assembly, respectively.

12. An antenna configuration for an unmanned aerial vehicle (UAV), comprising:
at least one pair of patch antennas wherein each one of said at least one pair of patch antennas has a patch mounted upon a ground plane;
an unmanned aerial vehicle (UAV) body having at least one portion constructed of a material that minimally attenuates an electromagnetic signal transmitted or received by any one of said at least one pair of patch antennas;
wherein said at least one pair of patch antennas are mounted within said unmanned aerial vehicle (UAV) body so as to be near an inner surface portion of said unmanned aerial vehicle (UAV) body;
wherein said at least one pair of patch antennas are installed so as to be disposed opposite to one another;
wherein each one of said patches of said at least one pair of patch antennas faces outwardly from said unmanned aerial vehicle (UAV) body; and
wherein said at least one pair of patch antennas comprise air data terminal (ADT) type antennas.

13. An antenna configuration for an unmanned aerial vehicle (UAV) according to claim 12, wherein:
said at least one pair of patch antennas are installed upon an antenna assembly located inside of said unmanned aerial vehicle (UAV).

14. An antenna configuration for an unmanned aerial vehicle (UAV) according to claim 13, wherein:
said at least one pair of patch antennas can be reassembled from said antenna assembly.

15. An antenna configuration for an unmanned aerial vehicle (UAV) according to claim 13, wherein:
said antenna assembly is constructed in such a manner that said at least one pair of patch antennas are assembled inside of said unmanned aerial vehicle (UAV) cylindrical body as close as is available to said inner surface portion of said unmanned aerial vehicle (UAV) body.

16. An antenna configuration for an unmanned aerial vehicle (UAV) according to claim 12, wherein:
in order to decrease noise interference with said at least one pair of patch antennas, the patch antenna, of said at least one pair of patch antennas, having the strongest signal during a segment of time will be used to transmit and/or receive wireless data communication to/from an unmanned aerial vehicle (UAV) ground control station.

17. An antenna configuration for an unmanned aerial vehicle (UAV) according to claim 12, wherein:
said at least one pair of patch antennas are positioned in such a manner that antenna radiating elements of said at least one pair of patch antennas are disposed opposite to one another and together have omni-directional electromagnetic communication so as to ensure a proper data link between said unmanned aerial vehicle (UAV) and a ground control station; and
wherein a first one of said at least one pair of patch antennas has better electromagnetic communication coverage within a front region of said unmanned aerial vehicle (UAV) with respect to a second one of said at least one pair of patch antennas, while said second one of said at least one pair of patch antennas has better electromagnetic communication coverage within a rear region of said unmanned aerial vehicle (UAV) with respect to said first one of said at least one pair of patch antennas.

18. An antenna configuration for an unmanned aerial vehicle (UAV) according to claim 12, wherein:
both of said at least one pair of patch antennas are tuned and calibrated in a fully populated unmanned aerial vehicle (UAV) in order to ensure that said at least one pair of patch antennas fit best with respect to a relevant frequency band and band-width, while maintaining an omni-directional electromagnetic communication coverage so as to ensure a proper data link between said unmanned aerial vehicle (UAV) and a ground control station.

19. An antenna configuration for an unmanned aerial vehicle (UAV) according to claim 12, wherein:
each patch of said at least one pair of patch antennas is removable and replaceable with another patch having a slightly different dimension.

20. An antenna configuration for an unmanned aerial vehicle (UAV) according to claim 13, wherein:
said at least one pair of patch antennas are mounted opposite to one another and within upper and lower regions of said antenna assembly, respectively.

* * * * *